June 19, 1934.  S. B. STINE  1,963,425
METHOD OF AND APPARATUS FOR FORMING SCREENS
Filed June 10, 1933

INVENTOR
Samuel Blaine Stine,
By Archworth Martin,
Attorney.

Patented June 19, 1934

1,963,425

UNITED STATES PATENT OFFICE 1,963,425

METHOD OF AND APPARATUS FOR FORMING SCREENS

Samuel Blaine Stine, Osceola Mills, Pa.

Application June 10, 1933, Serial No. 675,265

5 Claims. (Cl. 164—80)

My invention relates to a method of and apparatus for forming screens, and more particularly to slotted metallic screens of the strainer type.

In my copending application, Serial No. 613,021, filed May 23, 1932 (now Patent No. 1,922,828), I disclose a means and a method for making metallic screens. The said method contemplates the drilling of starting holes that facilitates the cutting or burning of slots by a torch. Thereafter, the screen plate may be pressed in directions transversely of the lines of the slots in order to reduce the slot widths. The holes at the end of the slots may then be filled by arc welding, and the surface of the screen plate or screen is then ground to remove the protuberances and irregularities produced by the arc welding and pressing operations.

However, difficulty is sometimes experienced in securing slots of uniform width and free from obstructions such as slag. Even slight obstructions or slight irregularities in the walls of the slot are objectionable, particularly in view of the fact that the slots may be in the neighborhood of .009 inch in width.

One object of my invention is to provide a convenient means and method for clearing the slots of obstructions and for securing the desired uniformity of spacing between the walls of each slot throughout its length and depth.

Another object of my invention is to provide an improved tool for use in effecting the said results.

Figure 1:
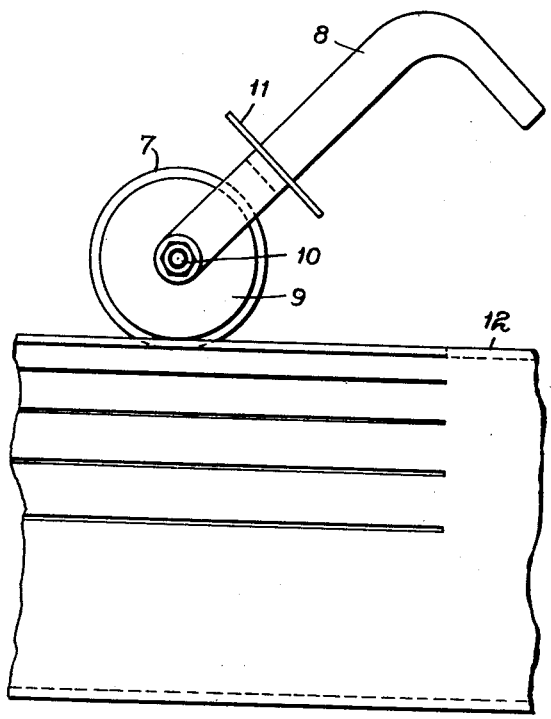
Figure 2:
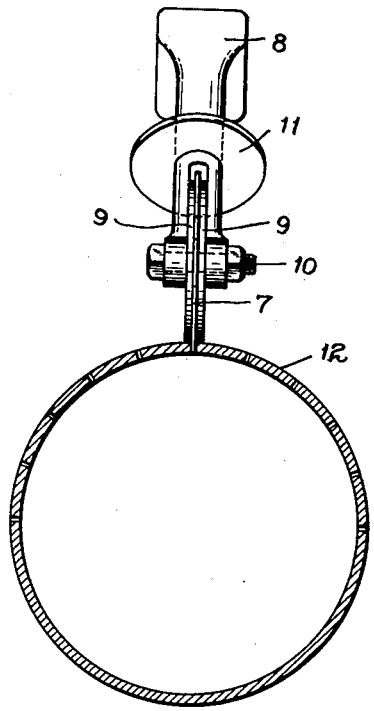
Figure 3:
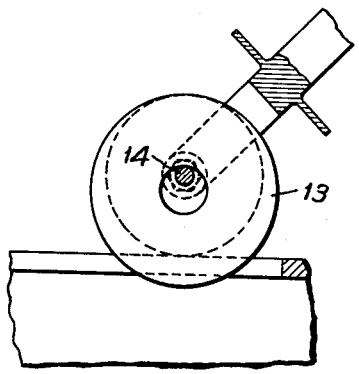
Figure 4:
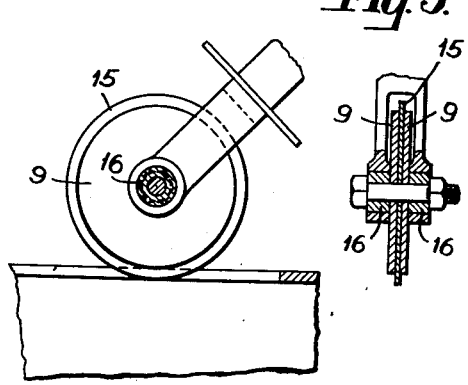
Figure 5:
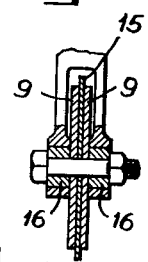

One manner of effecting the final shaping of the slots is shown in the accompanying drawing wherein Figure 1 is a longitudinal view of a portion of a tubular screen showing a saw or slot-opening tool in operative position with respect thereto; Fig. 2 is a cross sectional view of the structure of Fig. 1; Fig. 3 is a view showing a modified form of mounting for the saw or cutting disc of the tool; Fig. 4 is a longitudinal sectional view showing a modification of the tool of Fig. 1, and Fig. 5 is a cross sectional view of the tool of Fig. 4.

As above-stated, the roughness and irregularities produced by the flame-cutting of the slot, the filling of the drilled holes at the ends of the slots, and the pressing operation reducing the width of the slots after they have been initially formed, is eliminated by grinding tools. For example, a coarse emery wheel may be employed to grind down the protuberances of the metal which has been filled into the end holes by arc-welding. A grind stone may then be employed to still further smooth the deposited metal and to remove marks produced by the pressing, and to remove rough edges which may have been left by the flame-cutting torch.

However, the various operations above-referred to leave irregularities in the slot walls, and slag may be lodged in the slots. Furthermore, the slots may be wider at the underside of the plate than at the top surface thereof.

In the present operation, the slots are preferably initially formed or narrowed to a width somewhat less than that desired for the finished slots, so as to insure against wide places in the slots of the finished screen. For example, if the slots are to have a final width of .009 inch, the pressing operation is carried to a point at which the initially-formed slots are reduced to a width of .008 inch.

In order to clear the slots of any lodged particles and to enlarge them to desired uniform widths, I employ a saw or cutting disc 7, preferably of hard steel. This disc is mounted in the bifurcated end of a handle 8. A clamping plate or guide disc 9 is placed at each side of the disc 7 and a bolt 10 extends through the forward end of the handle and the members 7 and 9, the nut of the bolt being tightened enough to clamp the parts firmly together. A protective collar 11 is welded or otherwise secured to the handle 8, to protect the hand of the user against contact with the saw or cutting disc 7.

The tool is shown as being employed in the shaping or conditioning of slots formed in a screen pipe 12. The tool is moved along each slot to force out loose material which is lodged therein, and the corners of the tool exert a cutting action on the walls of the slots, after the manner of a plane, to enlarge them to the desired uniform width throughout their length and depth. For light work, the user may simply grasp the handle 8 and push the cutting plate along the slot, at the same time rocking it slightly on its axis. If greater pressure is required, the user may grasp the handle 8 with one hand and the ends of the bolt 10 with the thumb and fingers of the other hand.

The guide discs 9 not only limit the depth to which the cutting disc or saw may enter the slot, but support the cutting disc against twisting or tilting on its axis, to thereby reduce danger of breaking the cutting disc through twisting forces thereon caused by crooked slot walls or other protuberances.

As shown in Fig. 3, the cutting disc 13 has a central hole very much larger than the diameter of the clamping bolt 14, so that the disc may be adjusted radially to enter the slot for a greater distance, particularly where slag is lodged over the slot at the inner surface of the screen.

In this form, as in Figs. 1 and 2, the disc can be adjusted circumferentially to present unworn cutting edges to the slot walls.

In Figs. 4 and 5, I show a disc 15 that is rotatable with respect to the handle. In this structure, bushings 16 are provided and the clamping bolt is employed to draw them firmly against the guide discs 9 and the saw or cutting disc 15. The members 9, 15 and 16, will therefore rotate as a unit with respect to the handle.

While I have shown in the drawing the tool as employed in connection with a screen pipe, it will be understood that the invention is equally applicable to flat screen plates. Also the invention may be employed on screens of iron, brass, or other material.

The tool is therefore not only employed in connection with the manufacture of screens, but may be employed also for removing obstructions from screen slots after the screens have been placed in service. Thus, it may be employed to clear well screen slots of sand, and to clear the slots of pulp screens, etc.

I claim as my invention:—

1. A tool for conditioning screen slots and the like, comprising a holder, a cutting disc having corners positioned to engage the walls of a slot when the tool is moved therethrough, to thereby remove surplus material from said walls, and guide discs mounted against the sides of the cutting disc in concentric relation therewith, to engage the surface of a screen body in which the cutting tool is operating.

2. A tool for conditioning screen slots and the like, comprising a holder, a cutting disc, guide discs concentrically disposed against the sides of the cutting disc and overlying the major portion thereof, and a clamping bolt extending through the said discs and said holder, for holding the guide discs snugly against the sides of the cutting disc, and for connecting the discs to the holder.

3. A tool for conditioning screen slots and the like, comprising a holder, a cutting disc, guide discs concentrically disposed against the sides of the cutting disc and overlying the major portion thereof, means holding the guide discs snugly against the sides of the cutting disc, and means for connecting the discs to the holder, the cutting disc being adjustable radially of said holding means and the other discs.

4. A tool for conditioning screen slots and the like, comprising a holder, a cutting disc having corners positioned to engage the walls of a slot when the tool is moved therethrough, to thereby remove surplus material from said walls, and guide discs mounted against the sides of the cutting disc in concentric relation therewith, to engage the surface of a screen body in which the cutting tool is operating, the cutting disc protruding from between the guide discs a distance approximately equal to the thickness of the metal to be cut.

5. A tool for conditioning screen slots and the like, comprising a holder, a cutting disc having corners positioned to engage the walls of a slot when the tool is moved therethrough, to thereby remove surplus material from said walls, guide discs mounted against the sides of the cutting disc in position to engage the surface of a screen body in which the cutting tool is operating, each of said discs having a central opening therethrough, and a clamping bolt extending through said openings, for rigidly holding all of said discs in assembled relation, the opening in the cutting disc being of greater diameter than the diameter of the clamping bolt.

SAMUEL BLAINE STINE.